United States Patent [19]

Hoisington et al.

[11] Patent Number: 4,961,082

[45] Date of Patent: Oct. 2, 1990

[54] DEAERATION OF INK IN AN INK JET SYSTEM

[75] Inventors: Paul A. Hoisington; Nathan P. Hine, both of Norwich; Charles W. Spehrley, Jr., Hartford, all of Vt.

[73] Assignee: Spectra, Inc., Hanover, N.H.

[21] Appl. No.: 272,004

[22] Filed: Nov. 15, 1988

Related U.S. Application Data

[63] Continuation of Ser. No. 43,372, Apr. 28, 1987, Pat. No. 4,788,556.

[51] Int. Cl.[5] .......................... G01D 15/16; B41J 2/01; B01D 19/00

[52] U.S. Cl. .................................... 346/140 R; 55/159

[58] Field of Search .......................... 346/140, 1.1, 75; 55/159

[56] References Cited

U.S. PATENT DOCUMENTS 4,301,459 11/1981 Isayama et al. .............. 346/140 PD
4,460,904 7/1984 Oszczakiewicz et al. .... 346/140 PD
4,469,495 9/1984 Hiraizumi et al. .................... 55/159
4,502,055 2/1985 Horike et al. .................. 346/140 IJ
4,571,599 2/1986 Rezanka ....................... 346/140 PD
4,729,773 3/1988 Shirato et al. ......................... 55/159
4,787,921 11/1988 Shibata .................................. 55/159

*Primary Examiner*—Mark J. Reinhart
*Attorney, Agent, or Firm*—Brumbaugh, Graves, Donohue & Raymond

[57] ABSTRACT

In the particular embodiment of an ink deaerator described in the specification, an elongated ink path leading to an ink jet head is formed between two permeable membranes. The membranes are backed by air plenums which contain support members to hold the membranes in position. Reduced pressure is applied to the plenums to extract dissolved air from the ink in the ink path. Increased pressure can also be applied to the plenums to eject ink from the ink jet head for purging. Within the ink jet head ink is circulated convectively from the orifice to the deaerating path even when the jet is not jetting ink.

7 Claims, 1 Drawing Sheet

DEAERATION OF INK IN AN INK JET SYSTEM

This application is a continuation of application Ser. No. 043,372, filed on Apr. 28, 1987, now U.S. Pat. No. 4,788,556.

BACKGROUND OF THE INVENTION

This invention relates to methods and apparatus for the elimination of dissolved air from ink used in an ink jet apparatus and, more particularly, to a new and improved method and apparatus for deaerating ink in a highly effective manner.

In many ink jet systems, ink is supplied to a chamber or passage connected to an orifice from which the ink is ejected drop-by-drop as a result of successive cycles of decreased and increased pressure applied to the ink in the passage, usually by a piezoelectric crystal having a pressure-generating surface communicating with the passage. If the ink introduced into the passage contains dissolved air, decompression of the ink during the reduced pressure portions of the pressure cycle may cause the dissolved air to form small bubbles in the ink within the passage. Repeated decompression of the ink in the chamber causes these bubbles to grow and such bubbles can produce malfunctions of the ink jet apparatus.

Heretofore, it has been proposed to supply deaerated ink to an ink jet apparatus and maintain the ink in a deaerated condition by keeping the entire supply system hermetically sealed using, for example, flexible plastic bags or pouches as a deaerated ink supply. Such arrangements are not entirely satisfactory, however, because the flexible plastic pouches are at least partially air-permeable and, in hot melt ink systems, this problem is aggravated because the plastic pouch material becomes more permeable to air at elevated temperatures at which the heated ink is capable of dissolving large amounts of air, e.g., up to 20 percent by volume. Moreover, air may dissolve into the ink at the ink jet orifice during periods of non-jetting. Such dissolved air may diffuse through the ink into the jet pressure chamber, and thereby cause malfunction of the jet. Consequently, air bubble formation in the ink jet head of a hot melt jet apparatus is a primary cause of hot melt ink jet failure.

Accordingly, it is an object of the present invention to provide a new and improved method and apparatus for eliminating dissolved air from ink in an ink jet system which overcomes the above-mentioned disadvantages of the prior art.

Another object of the invention is to provide a system for deaerating ink in an ink jet system and for purging any air bubbles which have been formed in the ink jet head.

SUMMARY OF THE INVENTION

These and other objects of the invention are attained by subjecting ink in an ink jet system to reduced pressure applied through a membrane which is permeable to air but not to ink. In one form of the invention, ink is conveyed to an ink jet head through a passage which communicates through a permeable membrane with a plenum maintained at a reduced air pressure. To eject any air bubbles which may have been formed prior to removal of dissolved air, the permeable membrane may be flexible and an increased air pressure may be applied to the membrane which raises the pressure on the ink in the jet, causing expression of such ink and thus purging the jet of air bubbles.

In a particular embodiment, the ink supply leading to the ink jet head includes a deaerating passage in which the ink is formed into an elongated thin layer between two opposite wall portions and at least one of the wall portions comprises a flexible, air-permeable membrane covering a plenum in which the air pressure may be reduced or increased. In addition, a check valve is provided upstream from the deaerating passage so that increased pressure in the plenum will eject ink and any trapped air bubbles from the ink jet head. Within the ink jet head, ink is circulated by convection from the orifice to the deaerating passage.

BRIEF DESCRIPTIONS OF THE DRAWINGS

Further objects and advantages of the invention will be apparent from reading of the following description in conjunction with accompanying drawings, in which:

FIG. 1 is a block diagram, partly in section, schematically illustrating a representative embodiment of an ink jet ink supply including an ink deaerator in accordance with invention; and FIG. 2 is an en cross-sectional view of the ink deaerator used in the ink supply system of FIG. 1.

DESCRIPTION OF PREFERRED EMBODIMENT

Figure 1:
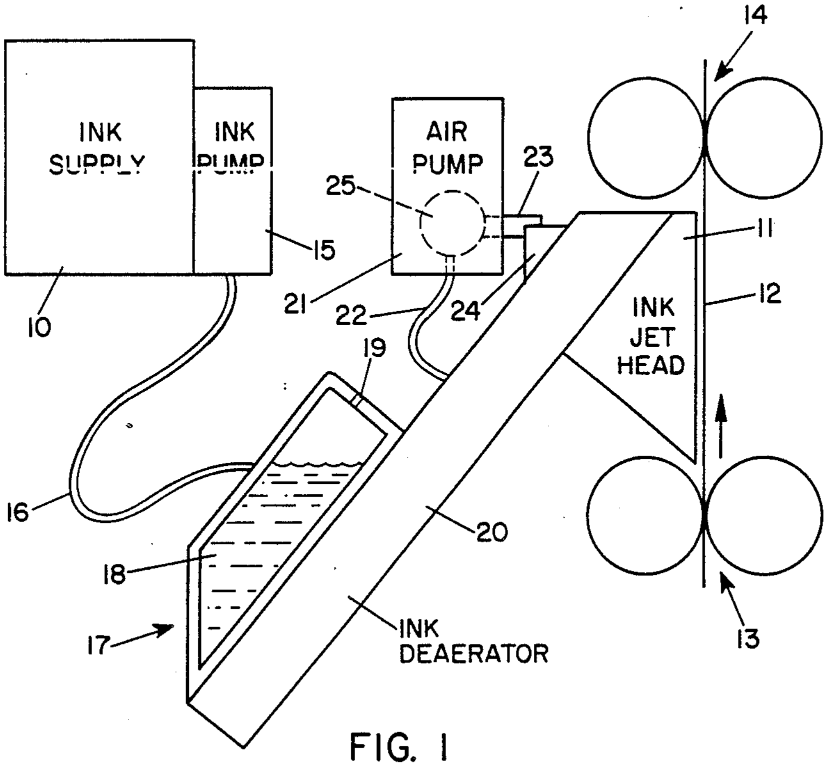

In the typical embodiment of the invention illustrated in the drawings, an ink jet apparatus includes an ink supply reservoir 10 holding liquid ink for use in an ink jet head 11 from which ink is ejected to produce a desired pattern on a sheet or web 12 of paper or other image support material in the usual manner. The ink jet head 11 is supported by conventional means for reciprocal motion transverse to the web 12, i.e., perpendicular to the plane of FIG. 1, and the web is transported by two sets of drive rolls 13 and 14 in the direction indicated by the arrow past the ink jet head.

The ink supply system includes an ink pump 15 for transferring ink from the ink supply 10 through a flexible supply line 16 to a reservoir 17 which is supported for motion with the ink jet head 11. If hot melt ink is used in the ink jet apparatus, the ink supply system may be of the type described in the Hine et al. U.S. Pat. application Ser. No. 043,369, filed Apr. 28, 1982, for "Hot Melt Ink Supply System", now U.S. Pat. No. 4,814,786 assigned to the same assignee as the present application. In that ink supply system ink is transferred from the ink supply 10 to the reservoir 17 only when the level of the ink 18 in the reservoir is low.

To maintain the ink in the reservoir 17 at atmospheric pressure, a vent 19 is provided. Accordingly, the ink 18 standing in the reservoir 17 contains air even if the ink was protected from air in the ink supply 10. Moreover, when hot melt inks are used, as much as 20 percent by volume of air may be dissolved in the ink. If ink containing such dissolved air is subjected to the periodic decompression which takes place in the ink jet head 11, air bubbles can form in the ink, causing failures in the operation of the ink jet head.

To overcome this problem in accordance with the present invention, an ink deaerator 20 is provided in the ink supply path between the reservoir 17 and the ink jet head 11. An air pump 21 is connected through a flexible air line 22 to provide increased or reduced air pressure to the ink deaerator. The ink deaerator 20 is mounted for reciprocal motion with the ink jet head 11 and the reservoir 17, and, in the illustrated embodiment, the air pump 21 is operated by engagement of a projectable pump lever 23 with a projecting lug 24 on the deaerator 20 during the reciprocal motion of the deaerator.

The pump lever 23 is connected to a piston 25 within the pump arranged so that, if negative pressure is to be provided to the deaerator, the pump lever will be engaged during motion of the deaerator in one direction, causing the piston to move in a direction to apply reduced pressure through the line 22, after which the piston may be locked in position. If increased pressure is to be applied to the deaerator, the lever 23, together with the piston 25, is moved in the opposite direction by the lug 24.

Figure 2:
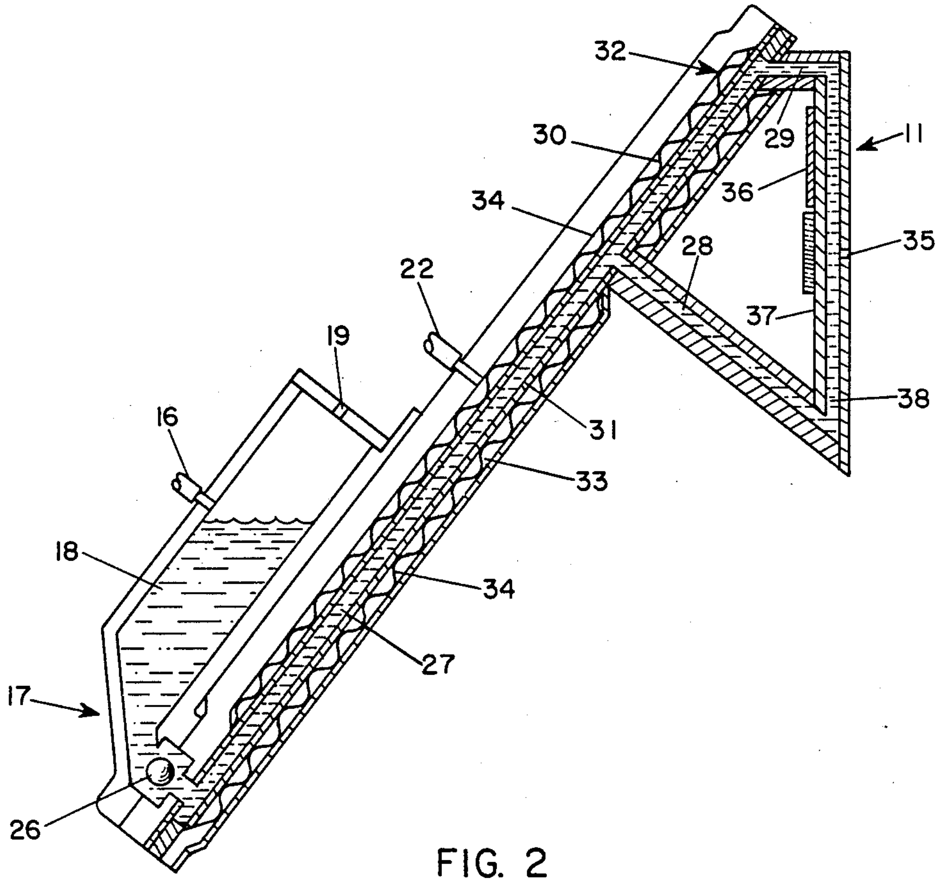

The internal structure of the deaerator 20 and the ink jet head 11 is shown in the sectional view of FIG. 2. At the lower end of the reservoir 17 a check valve 26 is arranged to permit ink to pass from the reservoir to a narrow elongated deaerating passage 27 which leads to two passages 28 and 29 in the ink jet head 11 through which ink is supplied to the head. In a particular embodiment, the passage 27 is about 0.04 inch thick, 0.6 inch wide and 3½ inches long and is bounded by parallel walls 30 and 31 which are made from a flexible sheet material which is permeable to air but not to ink. The material may, for example, be a 0.01 inch thick layer of medical grade silcone sheeting such as Dow Corning SSF MEXD-174.

On the other side of the membranes 30 and 31 from the passage 27, air plenums 32 and 33, connected to the air line 22, are provided. Each plenum contains a membrane support 34 consisting, in the illustrated example, of a corrugated porous sheet or screen, to support the membrane when the pressure within the plenum is reduced. The air pump 21 is arranged to normally maintain pressure within each plenum at less than about 0.75 atmosphere and, preferably at about 0.4 to 0.6 atmosphere. In addition, the length and width of the passage 27 are selected so that, during operation of the ink jet head, the ink being supplied thereto is subjected to a reduced pressure within the passage for at least about one half minute and, preferably for at least one minute. With this arrangement, enough dissolved air is extracted through the membranes 30 and 31 from the ink within the passage to reduce the dissolved air content of the ink below the level at which bubbles can be formed in the ink jet head.

The membranes 30 and 31 and the plenums 32 and 33 are also arranged to expel ink which may contain air bubbles through the orifice 35 in the ink jet head 11 when operation of the system is started after a shutdown. For this purpose the air pump 21 is arranged as described above to supply increased pressure through the line 22 to the deaerator 20. This causes the flexible membranes 30 and 31 to move toward each other. Since the check valve 26 prevents ink from moving back into the reservoir 17, the ink in the passage 27 is forced into the ink jet head 11, expelling any ink therein which may contain air bubbles through the ink jet orifice 35.

In order to deaerate ink in the ink jet head 11 which may have dissolved air received through the orifice 35, a heater 36 is mounted on the rear wall 37 of an ink jet passage 38 which leads from the passages 28 and 29 to the orifice 35. When the heater 36 is energized, ink in the passage 38 which may contain dissolved air received through the orifice 35 during inactive periods in the operation of the jet is circulated continuously by convection upwardly through the passage 38 and then through the passage 29 to the deaerating passage 27. In the deaerating passage 27 the ink is deaerated as it moves downwardly to the passage 28, and it then returns through the passage 28 to the passage 38.

In operation, ink from the reservoir 17, which contains dissolved air, is transferred to the ink jet head 11 through the passage 27 as the ink jet head operates. The reduced pressure in the plenums 32 and 33 causes dissolved air in the ink to be extracted from the ink through the membranes 30 and 31. As the deaerator 20 moves in its reciprocal motion, the air pump 21 is operated by the lug 24 and lever 23 to maintain reduced pressure in the plenums. When it is necessary to expel ink from the ink jet head on start-up of the system, the air pump 21 is arranged to supply increased pressure to the plenums 32 and 33. During nonjetting periods of the ink jet head, the ink circulates convectively through the passages 38, 29, 27 and 28, transporting ink which may contain air from the orifice 35 to the deaerator.

Although the invention has been described herein with reference to a specific embodiment, many modifications and variations therein will readily occur to those skilled in the art. For example, the permeable membrane and air plenum may form one wall of an ink reservoir. Accordingly, all such variations and modifications are included within the intended scope of the invention as defined by the following claims:

We claim:

1. A device for removing dissolved gas from ink in an ink jet system comprising gas-permeable, ink-impermeable membrane material in sheet form, support means for supporting the sheet-form membrane material in a substantially planar disposition, means for applying ink containing dissolved gas to one side of the sheet-form membrane material, and means for applying a reduced gas pressure to the other side of the sheet-form membrane material to cause gas dissolved in ink to be extracted from the ink through the sheet-form membrane material.

2. A device according to claim 1 wherein the sheet-form membrane thickness is approximately 0.01 inch.

3. A device according to claim 1 wherein the sheet-form membrane material comprises a flexible polymer material.

4. A device according to claim 2 wherein the sheet-form membrane material comprises silicone sheet material.

5. A method for removing dissolved gas from ink in an ink jet system comprising providing sheet-form gas permeable, ink-permeable membrane material, supporting the sheet-form membrane material in a substantially planar disposition, applying ink containing dissolved gas to one side of the sheet-form membrane material, and applying reduced gas pressure to the other side of the sheet-form membrane material.

6. A method according to claim 5 wherein the sheet-form membrane material comprises a flexible polymer material.

7. A method according to claim 6 wherein the sheet-form membrane material comprises silicone sheet material.

* * * * *

UNITED STATES PATENT AND TRADEMARK OFFICE
CERTIFICATE OF CORRECTION

PATENT NO. : 4,961,082

DATED : October 2, 1990

INVENTOR(S) : Paul A. Hoisington et al.

It is certified that error appears in the above-identified patent and that said Letters Patent is hereby corrected as shown below:

Column 2, line 20: The word "supply" should read --supply system--; line 22: The word "en" should read --enlarged--; line 44: The year "1982" should read --1987--.

Column 3, line 25: The word "silcone" should read --silicone--.

Column 4, line 52: The word "ink-permeable" should read --ink-impermeable--.

Signed and Sealed this

Twenty-fifth Day of February, 1992

*Attest:*

HARRY F. MANBECK, JR.

*Attesting Officer*

*Commissioner of Patents and Trademarks*